Figure 3:
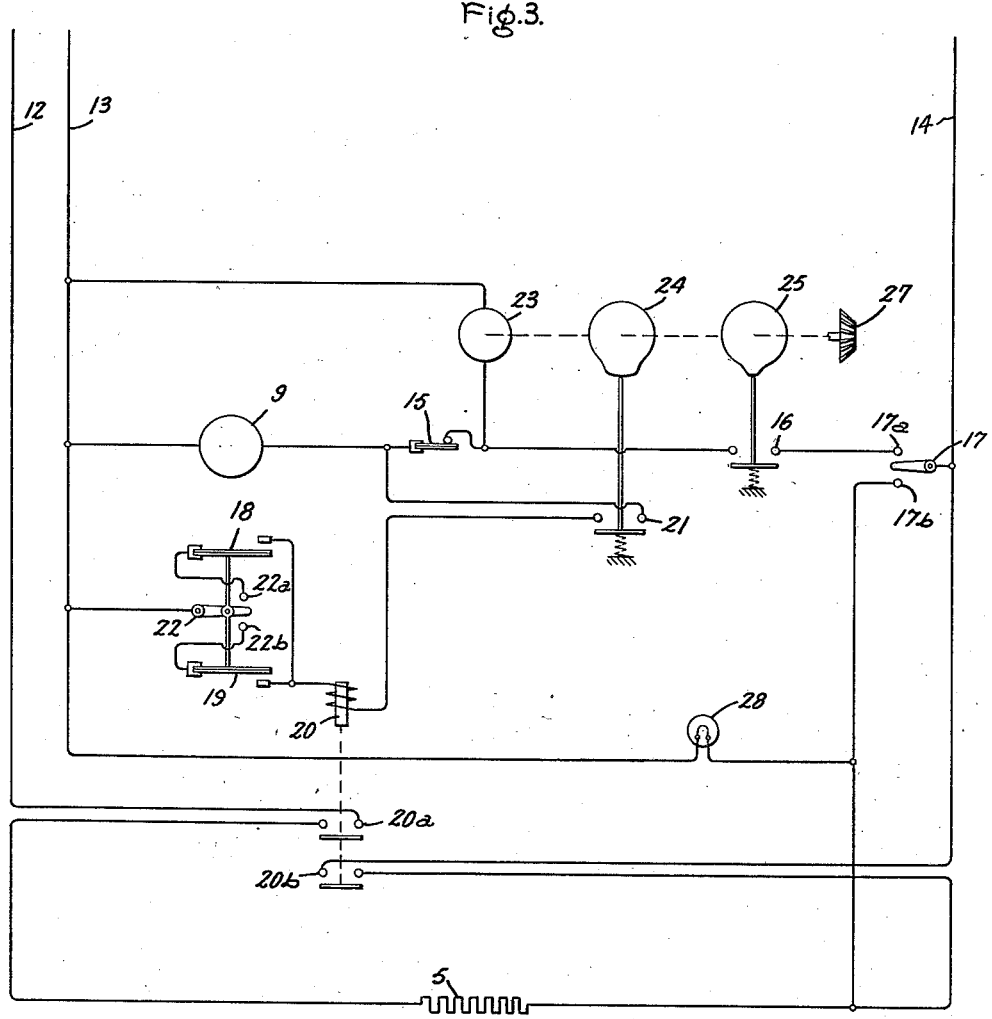

March 25, 1952     E. A. WAGNER     2,590,808
CONTROL SYSTEM FOR LAUNDRY DRIERS AND THE LIKE
Filed Aug. 2, 1950     2 SHEETS—SHEET 1
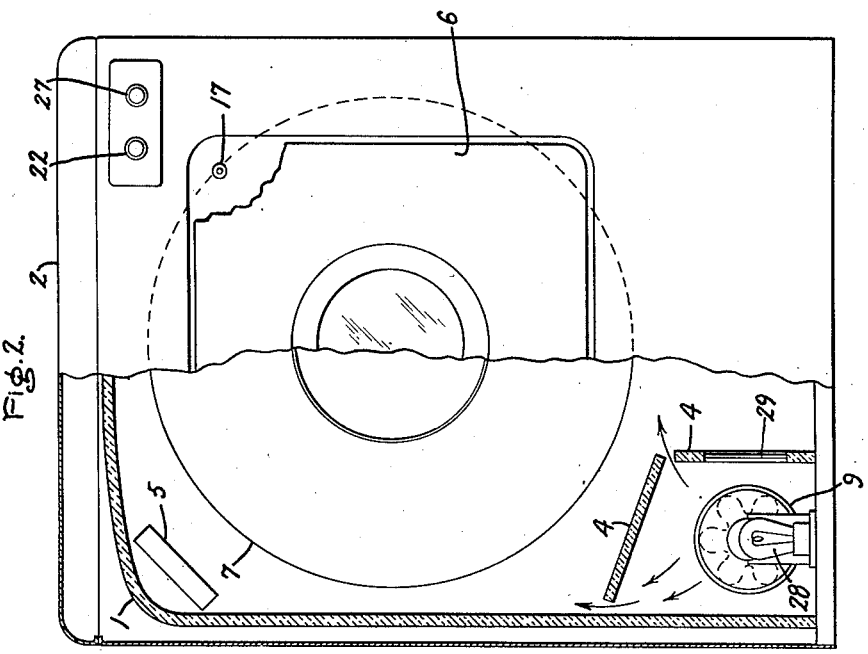
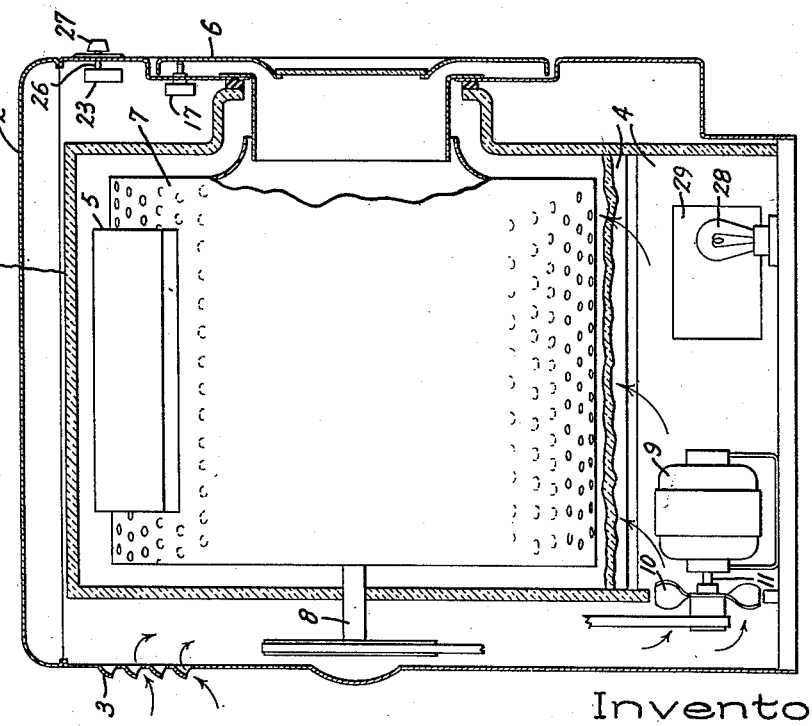
Inventor:
Ernest A Wagner,
by   *Sheridan...*
His Attorney.

Patented Mar. 25, 1952

2,590,808

UNITED STATES PATENT OFFICE 2,590,808

CONTROL SYSTEM FOR LAUNDRY DRIERS AND THE LIKE

Ernest A. Wagner, Lordship, Conn., assignor to General Electric Company, a corporation of New York Application August 2, 1950, Serial No. 177,219

3 Claims. (Cl. 34—45)

1

My invention relates to control systems for laundry driers and the like, and more particularly to control systems for electric clothes driers and the like.

My invention has for its object to provide in electric clothes driers and the like an improved control system energized by a source of normal domestic electric potential and embodying safety features to be hereinafter enumerated and described.

In carrying out my invention in one form thereof an electric clothes drier is provided with a drive motor, a heater, and a control circuit energized by a source of normal domestic electric potential. The control circuit comprises an overload relay in the drive motor circuit, a thermostatically controlled switching device with contacts in the heater circuit, an interlock switch operated by the door of the drier, and switching means operated by an electric control motor for causing the drier to operate in a predetermined time cycle.

My invention will be better understood from the following description taken in connection with the accompanying drawings, and its scope will be pointed out in the appended claims. Fig. 1 is a side elevation in section of an electric clothes drier embodying my invention; Fig. 2 is a front view in partial section of the drier shown in Fig. 1; and Fig. 3 is a schematic circuit diagram of an electric clothes drier embodying my invention.

Referring to the drawing, the insulated casing 1 of the drier 2 has entrance louvers 3 and duct system 4 to permit passage of air through drier 2. An electrically energized heating means 5 is disposed near entrance louvers 3. Casing 1 also has a door 6 in the front thereof through which wet clothes may be passed into the foraminated tumbler 7. Tumbler 7 is mounted upon the shaft 8 which is suitably journaled in bearings provided in the rear wall of casing 1. Shaft 8 is connected to a drive motor 9 by a speed reduction means such as a system of belts and sheaves or the like. An impeller fan 10 is directly connected to motor 9 by the shaft 11.

Electric energy is supplied to drier 2 by supply conductors 12, 13 and 14. Supply conductor 13 will be considered to be at a preference level of potential such as ground potential. A normal domestic electric potential, such as 115 volts, is supplied to the control circuit by supply conductors 13 and 14. In the application herein described the potential between supply conductors 12 and 14 will be considered to be twice

2 that between conductors 13 and 14, such as 230 volts. It will be understood, however, that this is a preferred ratio since it causes rapid drying of the clothes, and that the potential between conductors 12 and 14 could just as easily be the same as the potential between conductors 13 and 14. One side of motor 9 is connected directly to supply conductor 13. The other side of motor 9 is connected to supply conductor 14 through an overload protective device such as the thermostatic cutout 15, the contacts 16, and an interlock switch, such as the single-pole-double-throw interlock switch 17. Contacts 17a are closed when door 6 is closed and contacts 17b are closed when door 6 is open.

The thermostats 18 and 19 are each responsive to a discrete temperature level. Thermostats 18 and 19 each have one side connected in common to one side of the operating coil of relay 20. The other side of the operating coil of relay 20 is connected to the drive motor circuit at a point between motor 9 and thermostat 15 by the contacts 21. The other sides of thermostats 18 and 19 are connected to contacts 22a and 22b respectively of the single-pole-double-throw switch 22. The pole of switch 22 is connected to supply conductor 13. One side of the control motor 23 is connected to supply conductor 13. The other side of control motor 23 is connected to the drive motor circuit at a point between thermostat 15 and contacts 16. The cams 24 and 25 are mounted on the shaft 26 which is mechanically connected to be rotated by control motor 23. The knob 27 is also mounted on shaft 26 for manually rotating shaft 26 to initiate the time cycle desired. Indicating lamp 28 is connected between supply conductor 13 and the contacts 17b. Contacts 17b are also connected to a point between heater 5 and contacts 20b. The normally open contacts 20a and 20b operated by relay 20 complete electrical connections between the heater 5 and supply conductors 12 and 14 respectively. A glass panel 29 is provided in duct system 4 so lamp 28 can illuminate the interior of drier 2.

Thermostats 18 and 19 are each responsive to a discrete temperature level. Before energizing drier 1 the operator selects the temperature level appropriate for the clothes to be dried by manipulating the switch 22. Knob 27 is rotated to the starting position for the time cycle desired thereby energizing the drier circuit. Contacts 16 are closed by cam 25 when shaft 26 is rotated manually. The control motor circuit is now complete through contacts 16, and contacts 17a to conductor 14. The drive motor circuit is completed through thermostat 15, contacts 16, and contacts 17a. When cam 24 closes contacts 21, relay 20 is energized through thermostat 18 or thermostat 19 as selected by switch 22, contacts 21, thermostat 15, contacts 16, and contacts 17a. Relay 20 closes normally open contacts 20a and 20b thereby energizing heater 5.

When heater 5 is energized, as hereinbefore described, indicating lamp 28 is connected between conductors 13 and 14 through contacts 20b and gives visual indication to the operator that the drier is functioning. If door 6 is subsequently opened, contacts 17a are opened. Relay 20 is deenergized, contacts 20a and 20b are opened, and heater 5 is de-energized. Drive motor 9 and control motor 23 are deenergized and further rotation of shaft 26 and cams 24 and 25 is stopped. Opening door 6 closed contact 17b thereby energizing lamp 28 between supply conductors 13 and 14. Thus, opening door 6 de-energizes all elements of drier 2 except indicating lamp 28 which now serves as an interior illuminating lamp.

Upon reclosing door 6, a new chain of operations is initiated. Contact 17b is opened and contact 17a is closed. Relay 20 is energized reclosing contacts 20a and 20b, thereby energizing heater 5 once more. As soon as contact 20b closes lamp 28 is energized, thereby informing the operator that heater 5 is energized.

When the current through motor 9 rises above a predetermined level thermostat 15 opens the circuit of motor 9. Relay 20 is thereby deenergized disconnecting heater 5.

When the temperature in the drier casing rises above the level of the thermostat selected by switch 23 the contacts of the thermostat are opened, relay 20 is deenergized, and normally open contacts 20a and 20b are released thereby deenergizing heater 5. Drive motor 9 and control motor 23 continue to operate, but indicating lamp 28 is extinguished and gives visual evidence that the thermostat selected by switch 22 has cut off heater 5. The interior temperature is therefore up to the responsive level of the thermostat. In a normal drying cycle this condition obtains only when the clothes load is nearly dry. If the interior temperature falls below this responsive level, the thermostat recloses and heater 5 is re-energized. This cycle may repeat several times during the drying cycle, thus maintaining the interior temperature within a predetermined range.

As long as door 6 remains closed, drive motor 9 and control motor 23 continue to operate until contacts 16 are opened by cam 25. Cam 24 is provided with a wider eccentric portion than is cam 25 so that contacts 21 are opened before contacts 16. This action provides a cooling period at the conclusion of the predetermined drying cycle. At the conclusion of the complete drying cycle contacts 16 are opened and the entire drier is de-energized. The de-energizing of both drive motor 9 and light 28 inform the operator that the drying cycle is complete.

It will be noted that whenever the drier control circuit is deenergized as, for instance, by the opening of contact 17a or of contacts 16, the remaining elements of the control circuit are at ground potential, thereby eliminating any danger of electric shock to someone who may come in contact with one of the elements.

While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. In electric clothes driers and the like having a casing, a foraminated clothes receiving drum mounted for rotation in said casing, a door in one side of said casing, electrically operated heater means within said casing for raising the air and the clothes temperature therein, a motor for rotating said drum, and circuits for respectively connecting said motor and said heater energizing means to a source of electrical energy: the improvement in said circuits comprising an overload responsive device having normally closed contacts in series in said motor circuit, a relay having normally open contacts in series in said circuit of said heater energizing means, a circuit for energizing said relay to close said normally open contacts, an electric control motor, a circuit for energizing said control motor, a plurality of cams driven by said control motor, a plurality of switching devices having contacts in series in said first-mentioned motor circuit and in series in said energizing circuit of said relay, said switching devices operated by said cams for controlling said drier in accordance with a predetermined time cycle, an electric indicating device, a first circuit for energizing said electric indicating device simultaneously with said heater energizing means, a second circuit for energizing said electric indicating device in response to the opening of said door, an interlock switching device operated by said door and having contacts opened in response to the opening of said door in series in said relay energizing circuit and in series in said first-mentioned motor circuit, said interlock switching device having contacts opened in response to the closing of said door in series in said second circuit of said electric indicating device, and a temperature-responsive switching device having normally closed contacts in series in said energizing circuit of said relay for deenergizing said relay and thereby deenergizing said heater energizing means in response to the attainment of a predetermined temperature level within said casing.

2. In electric clothes driers and the like having a casing, a foraminated clothes receiving drum mounted for rotation in said casing, a door in one side of said casing, electrically operated heater means within said casing for raising the temperature of the air and the clothes therein, a motor for rotating said drum, and circuits for respectively connecting said motor and said heater energizing means to a source of electrical energy: the improvement in said circuits comprising an overload responsive device having normally closed contacts in series in said motor circuit, a relay having normally open contacts in series in said circuit of said heater energizing means, a circuit for energizing said relay to close said normally open contacts, an electric control motor, a circuit for energizing said control motor, a plurality of cams driven by said control motor, a plurality of switching devices having contacts in series in said first-mentioned motor circuit and in series in said energizing circuit of said relay, said switching devices operated by said cams for controlling said drier in accordance with a predetermined time cycle, an electric indicating device, a first circuit for energizing said electric indicating device simultaneously with said heater energizing means, a second circuit for energizing said electric indicating device in response to the opening of said door, an interlock switching device operated by said door and having contacts opened in response to the opening of said door in series in said relay energizing circuit and in series in said first-mentioned motor circuit, said interlock switching device having contacts opened in response to the closing of said door in series in said second circuit of said electric indicating device, a plurality of temperature-responsive switching devices mounted within said casing, each of said temperature-responsive switching devices having a set of normally closed contacts, and a manual switching device for connecting selectively said temperature responsive switching devices in series relation with said relay.

3. In electric clothes driers and the like having a casing, a foraminated clothes receiving drum mounted for rotation in said casing, a door in one side of said casing, electrically operated heater means within said casing for raising the temperature of the air and the clothes therein, a circuit for connecting said heater means to a first source of electrical energy having a potential approximately twice normal domestic electric potential, a motor for rotating said drum, a circuit for connecting said motor to a second source of electrical energy, said second source of electrical energy having a potential approximately equal to normal domestic electric potential, an improved control circuit energized by said second source of electrical energy and comprising an overload responsive device having normally closed contacts in series in said motor circuit, a relay having normally open contacts in series in said circuit of said heater energizing means, a circuit for energizing said relay to close said normally open contacts, an electric control motor, a circuit for energizing said control motor, a plurality of cams driven by said control motor, a plurality of switching devices having contacts in series in said first-mentioned motor circuit and in series in said energizing circuit of said relay, said switching devices operated by said cams for controlling said drier in accordance with a predetermined time cycle, an electric indicating and illuminating device, a first circuit for energizing said electric indicating and illuminating device simultaneously with said heater energizing means, a second circuit for energizing said electric indicating and illuminating device in response to the opening of said door, an interlock switching device operated by said door and having contacts opened in response to the opening of said door in series in said relay energizing circuit and in said first-mentioned motor circuit, said interlock switching device having contacts opened in response to the closing of said door, in series in said second circuit of said electric indicating and illuminating device, and a variable temperature-responsive switching device having normally closed contacts in series in said energizing circuit of said relay for disconnecting said relay and thereby deenergizing said heater energizing means in response to the attainment of a predetermined temperature level within said casing.

ERNEST A. WAGNER.

REFERENCES CITED

The following references are of record in the file of this patent:

UNITED STATES PATENTS

| Number | Name | Date |
|---|---|---|
| 1,675,160 | Carroll | June 26, 1928 |
| 2,398,880 | Broglie | Apr. 23, 1946 |
| 2,470,043 | Monsarrat | May 10, 1949 |
| 2,505,041 | Gorsuch | Apr. 25, 1950 |
| 2,524,438 | Graves | Oct. 3, 1950 |
| 2,548,313 | Kauffman II | Apr. 10, 1951 |